United States Patent Office 3,322,510
Patented May 30, 1967

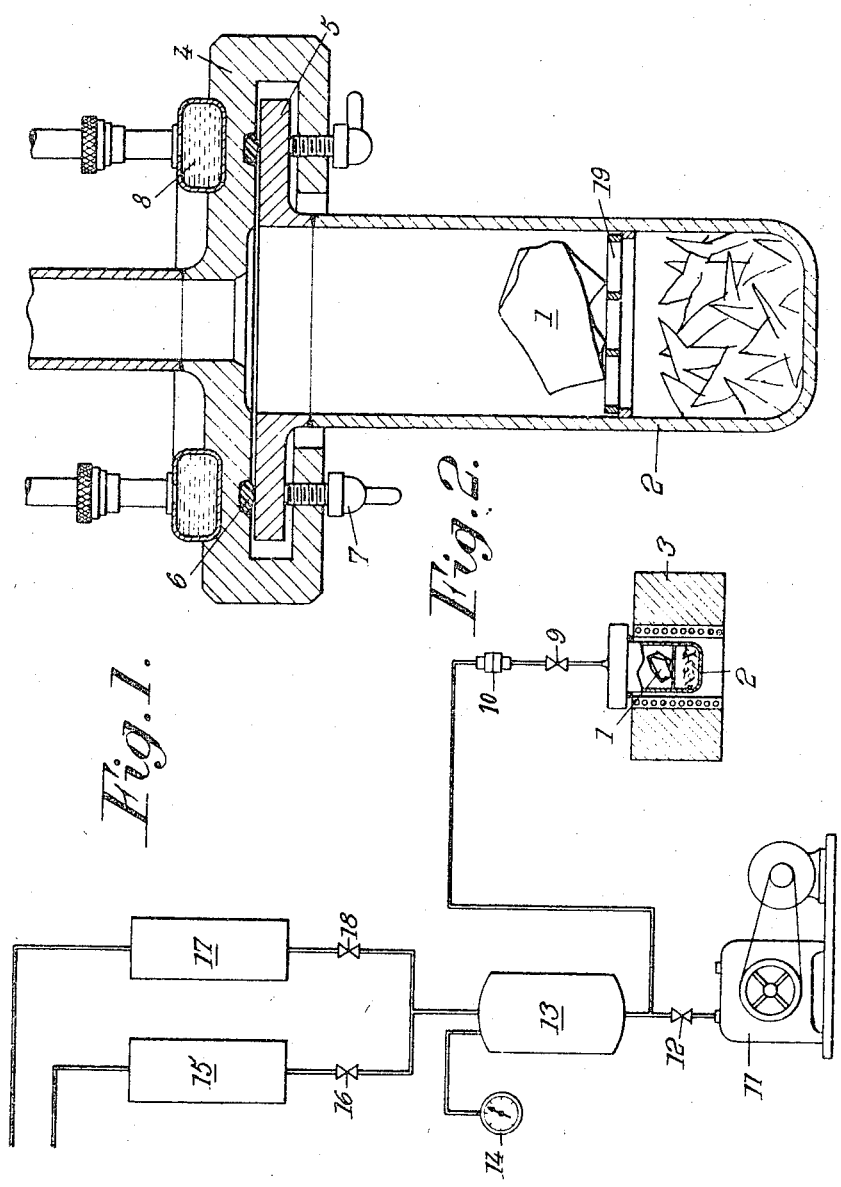

3,322,510
PROCESS FOR THE PREPARATION OF METALLIC NITRIDES
Francois Anselin, Paris, and Roger Pascard, Issy-les-Moulineaux, France, assignors to Commissariat à l'Energie Atomique, Paris, France
Filed Mar. 2, 1964, Ser. No. 348,405
Claims priority, application France, July 4, 1962, 902,271
4 Claims. (Cl. 23—347)

This application is a continuation-in-part of application Ser. No. 287,587, filed June 13, 1963, and now abandoned.

This invention relates to a process and apparatus for the practical application of said process for the preparation of metallic nitrides which are intended for subsequent sintering and more especially for the preparation of nitrides of metals of the transuranic group, of the rare earth metals and of yttrium.

It should be pointed out that the preparation of suitable quantities of uranium mononitride, for example, is at present based on indirect processes resulting in the first place in an intermediate product $U_2N_3$-$UN_2$ in the form of a solid solution having a composition which can vary between $UN_{1.5}$ and $UN_{1.8}$. The said solid solution is subsequent either dissociated or reduced into the mononitride UN.

The intermediate product was heretofore obtained by causing ammonia gas or nitrogen to react at suitable temperatures with uranium hydride $UH_3$ or with uranium metal in the finely divided state, all attempts at nitriding of massive uranium having failed. In point of fact, the metal is covered when heated in nitrogen with an adhesive layer of mononitride UN and sesquinitride $U_2N_3$, the reaction practically coming to an end as soon as the layer has reached a certain depth.

The nitrides of the rare earth metals are usually obtained as a result of the action of nitrogen or ammonia gas, either on said metals in the divided state or on the hydrides of these metals.

However, the divided metals readily react with oxygen, with the resulting danger that the nitrides obtained can very frequently be contaminated by this element. Consequently, it is preferable to start from the hydride as in the case of uranium, since hydrogen reacts with the metal so as to produce a powdered hydride which is then transformed into nitride as a result of the action of nitrogen or of ammonia gas.

The processes which consist in starting from the hydride, both in the case of uranium and in the case of the rare earths call for the installation of complex and cumbersome equipment in which it is necessary to perform successively the hydriding process then the nitriding process in order to avoid any transfer operations which would result in oxidation of the hydride. The apparatus must be air-tight. Moreover, as and when the nitriding process takes place, and in view of the fact that the dissociation of the hydride liberates considerable quantities of hydrogen, provision must be made either for the storage (static state) or for the discharge (dynamic state) of said substance which would otherwise be diluted with nitrogen. Finally, the time required for the application of these processes is even further protracted by the stage of formation of the hydride and, in certain cases, by the dissociation of said hydride in the second stage of the operation.

In those processes which are based on uranium metal in the form of chips and the like, it is also difficult to prevent a certain oxidation of said chips; moreover, the machining and cleaning of the chips entail a considerable increase in the cost price; and the processing equipments still have a volume which is not negligible in view of the bulk of the metal in the divided state.

Finally, the uranium metal powders which are obtained, for example, from $UO_2$ by thermal reduction process contain impurities such as, for example, oxides and traces of organic stabilizers, thereby giving rise to dangers of carburization.

The main arrangement of the invention is precisely intended to overcome the disadvantages attached to the prior art processes which have just been mentioned.

In order to carry out the surface hydriding of metallic elements in accordance with the invention, recourse can profitably be had to the apparatus which is illustrated in FIGS. 1 and 2 and which will be more specifically described hereinafter.

The process in accordance with the invention is characterized in that it consists in carrying out the nitriding operation on massave elements of metal previously subjected to a surface hydriding which facilitates the initiation and development of said nitriding operation towards the center of said elements. The process applies more especially to the metals of the transuranic group, to the rare earth metals and to yttrium.

Generally speaking, the metallic elements employed can have a number of different configurations such as rods, plates, ingots, lumps or pellets, etc., namely which have a massive appearance in contradistinction to any definition in the form of grains or metallic powders.

Further characteristic features of the invention, which will more clearly bring out the advantages provided by the process and the specially notworthy arrangements of the apparatus employed for the practical application of said process, will become more readily apparent from the following description in which one example of embodiment is given by way of indication without any limitaton being implied.

In the accompanying drawings, FIGS. 1 and 2 show diagrammatically and respectively a general view of the equipment employed and a vertical cross-section of a nitriding crucible together with accessories.

The apparatus according to the invention and working principle of said apparatus will now be dealth with more specifically in the description which follows.

In order that the description may be presented in more concrete form, it will be assumed hereinafter that the process together with its operating device is applied to the nitriding of uranium elements.

The elements 1 of uranium, for example, are placed inside a vessel 2 of stainless steel or of Monel metal which is in turn placed inside a furnace 3. The vessel 2 is closed by a cover 4 which is applied against a flange 5 forming one piece with said vessel, air-tightness being achieved by means of a gasket 6, for example of neoprene, which is compressed by means of screws 7 which are screwed through the cover and applied against the flange. The cooling of the gasket 6 is carried out indirectly by means of a water circulation system 8 which cools the cover 4, said cover being in contact with said gasket 6.

In order to put the process into operation, a vacuum is created inside the vessel 2 by means of a pump set 11. The pump set 11 is then isolated by means of the valve 12 and the apparatus is then filled by means of a surge tank 13 fitted with a pressure gauge 14 with hydrogen which has been passed through a drying column 15 normally isolated by means of a valve 16 with a view to eliminating any trace of moisture. The installation can advantageously be purged a number of times with hydrogen prior to filling the apparatus with a limited quantity of hydrogen at a pressure which can be slightly in excess of atmospheric pressure.

The valve 16 is then finally closed and the temperature is brought up to approximately 230° C.; at the end of a certain period of time which is usually less than one hour, a pressure drop in the installation indicates that the hydriding reaction has started. As a result of the quantities of gas and of metal which are present, this hydriding process remains superficial.

The nitriding operation is then carried out, preferably by making use of the same installation, thereby avoiding any handling and any danger of oxidation. To this end, it is merely necessary to provide the installation with a continuous supply of nitrogen under a pressure of 1 to 3 bars as processed through a drying column 17 which is normally isolated by a valve 18.

The temperature is progressively brought up to the vicinity of 400° C., the speed of reaction between the uranium and the nitrogen then becoming appreciable. The nitride is detached from the metal in the form of flakes. The surface of the metal is thus continuously renewed and the reaction can continue towards the center of the metallic element which is thus undergoing treatment. The uranium lumps are preferably placed on a wide-mesh grid 19 which is not an essential feature but which nevertheless prevents the packing of flakes around the metal which would be liable to result in a slowing-down of the nitriding reaction. It is also preferable to make provision for a device which can be employed for the purpose of subjecting the metallic elements located inside the vessel to vibrations which result in faster disintegration into nitride flakes. The reaction can accordingly be considered as completed at the end of a few hours, when the pressure no longer falls inside the apparatus if the valve 18 is shut off for a certain period of time.

The vessel 2 is then isolated by means of the valve 9 and separated from the remainder of the installation by means of the three-piece union 10 so as to permit of all subsequent handling operations such as, for example, the transfer of said vessel into a glove box.

In accordance with an alternative form of execution of the process, the metals of the transuranic group, the rare earth metals and yttrium can be subjected directly to the action of a mixture of hydrogen and nitrogen. The start of the reaction is found to take place as a result of a pressure drop and, from this moment, it is merely necessary to ensure a continuous supply of nitrogen in order that the reaction should continue in the normal manner. Accordingly, in the case of uranium, it is possible to introduce a mixture of hydrogen and nitrogen in the cold state and under pressure while bringing the temperature from the outset to 400° C.

The uranium nitride which is obtained is in the form of brittle laminae or flakes, the color of which ranges from black to ash grey. Said product is extremely active, is sensitive to traces of oxygen and of moisture and ignites spontaneously in contact with air. A crushing operation produces a black powder of fine and uniform particle size and having a metallic luster. This product is highly reproducible under given processing conditions, while the composition thereof varies between $UN_{1.7}$ and $UN_{1.8}$; X-ray diffraction shows that said product is a solid solution of sesquinitride and dinitride $U_2N_3-UN_2$ which exhibits a crystalline structure of the fluorine type, that is to say a face-centered cubic structure.

The intermediate product thus employed is employed for the purpose of preparing the mononitride which, in the case of uranium mononitride which is more especially contemplated, can be utilized as a nuclear fuel. The compound $UN_x$ is dissociated in vacuo starting from 800° C. The stoichiometric mononitride UN thus obtained is completely free of impurities, and is a compound which is suitable for sintering.

The process in accordance with the invention also permits the possibility of nitriding plutonium. Massive elements of plutonium which are subjected as a preliminary treatment to a surface hydriding are preferably nitrided at 350° C. The nitriding of plutonium results directly in the production of the mononitride PuN as shown by the X-ray diffraction spectrum of the final product.

In the process according to the present invention, there takes place a surface hydriding of rare earths and of yttrium starting from 350° C.; at this temperature, the hydriding speed is usually satisfactory, although it should be noted that the hydriding threshold largely depends on the state of surface of the starting element. The speed of reaction with nitrogen varies according to the nature of the rare earths which are employed: the reaction is almost immediate in the case of lanthanum and cerium between 450° C. and 500° C., is slower in the case of neodynium, but total between 500° and 650° C. Yttrium reacts slowly with nitrogen although the reaction is total between 600° and 800° C. The reaction takes place in a static atmosphere, thereby ensuring closer control over the purity of the gas and permitting the possibility of producing large quantities of nitrides without supervision.

As in the case of plutonium, the nitriding of rare earths and yttrium results directly in the production of mononitride.

In the case of small samples of rare earth metals and yttrium, that is to say of the order of a few cubic centimeters in volume, it is usually advantageous to carry out from the outset the simultaneous introduction of hydrogen and nitrogen with a view to preventing excessive hydriding which makes the nitriding of metals more difficult to perform.

In the case of large samples of the order of 50 grams, the process can be carried out in a similar manner or else by first performing a hydriding treatment, followed by a nitriding treatment.

The second mode of operation is to be preferred, however, in the case of large samples of rare earth metals having a low melting point such as, for example, lanthanum. In point of fact, if large samples are subjected directly to the simultaneous action of hydrogen and nitrogen, there takes place a very sharp rise in temperature, the quantities of heat evolved by the hydriding and nitriding reactions being added to each other, thus resulting in a melting of the metal at the center itself of the element which it is desired to nitride, thereby entailing the risk of causing the rupture of the surface layer of hydride which holds the molten mass and forms a crust around the element. In the case of small samples, this danger does not exist since the mass of molten metal is too small to bring about the rupture of the layer of hydride.

The nitriding stage can comprise a crushing operation if it is desired to accelerate the nitriding process.

A non-exclusive manner of practical execution of the process for the preparation of rare earth metals and of yttrium will now be given hereinafter by way of explanatory illustration.

The process is carried out on metallic elements of rare earths and yttrium which have relatively high melting points, and the samples on which the process is performed have a weight of the order of 50 grams. After having been subjected to a thorough mechanical cleaning treatment, said elements are heated in a first stage to a temperature which varies between 600° and 800° C. in an atmosphere containing one volume of hydrogen and 5 volumes of nitrogen at a pressure which can vary between 1 and 5 bars over a period of time which is less than 5 hours. There is accordingly obtained a nitriding rate, i.e., the percentage of metallic element nitrated, the mononitrate of uranium UN corresponding to a rate of nitration of 1, which can range from 0.85 to 0.95. The said metallic elements are then subjected after cooling to a crushing operation. The pieces obtained are brought in a second stage to approximately 800° C. for a period of ten hours, all other conditions of operation being the same as before. There are then obtained pure mononitrides of rare earths and of yttrium.

If the starting material employed consists of laminated elements, there is directly obtained without any preliminary crushing stage a nitriding rate which is equal to 1.

There now follows by way of non-limitative example a precise description of the process in accordance with the present invention as applied to uranium, plutonium and lanthanum.

*Example 1*

Provision is made for 600 grams of uranium in the form of cylindrical rods 3 centimeters in diameter which are placed inside a vessel, the volume of which is equal to 1 liter and which communicates with a surge tank, the volume of which is also equal to 1 liter; after having purged the apparatus, 3 liters of hydrogen are fed in so as to bring the pressure up to approximately 1.5 bar and the temperature is brought to 230° C.; after 20 minutes the pressure has dropped to 1 bar, which indicates that a surface hydriding process has taken place; from this moment, nitrogen is fed in continuously at a pressure of 2 bars for a period of 10 hours, the temperature being maintained at 400° C.; the product obtained under these conditions corresponds to $UN_{1.77}$. By dissociation in vacuo at a temperature which is greater than or equal to 800° C., mononitride is thus obtained and is then sintered under the usual conditions.

*Example 2*

In a similar apparatus, there are placed 25 grams of plutonium in the form of a small cylindrical rod 2.5 centimeters in length and 8 millimeters in diameter; in this case, the nitriding process is carried out at 350° C. and directly results in the production of mononitride in the form of agglomerated flakes.

*Example 3*

Provision is made for 50 grams of lanthanum as starting material, the sample is cleaned mechanically in oil then washed with acetone. The surface of the sample is thus endowed with a high luster.

The sample is placed in the nitriding vessel. The vessel is heated so that the temperature rises by 500° C. in 30 minutes while hydrogen is introduced in small quantities in such manner as to develop a pressure of 1.5 bars within the interior of the vessel. At this temperature, it is observed that there takes place an incipient surface hydriding which is immediately followed by a sharp temperature increase to 750° C. since the hydriding reaction is highly exothermic. The reaction lasts for a total period of 45 seconds and then the pressure within the vessel falls to 0.5 bar.

Nitrogen is then introduced until a pressure of 4 bars is developed within the vessel. There is immediately noticed an increase in temperature. After two hours of nitriding, the vessel is allowed to cool. A nitriding rate is thus obtained which is equal to 0.92.

There is then carried out a crushing operation. The pieces obtained are again placed in the vessel and heated to 800° C., the nitriding process is continued at this temperature for a period of 8 hours, finally yielding a pure mononitride of lanthanum.

*Example 4*

There is employed as starting material a sample of lanthanum having a weight of approximately 10 grams and provided in the form of a thin plate having a thickness of 2 to 3 millimeters.

The nitriding process takes place in this case in a single stage, the crushing operation being dispensed with.

The nitriding rate obtained is equal to 1.

It will be understood that the invention is not limited in any sense to the form of embodiment which has been described ad illustrated but is intended on the contrary to include within its scope all alternative forms.

What we claim is:

1. Process for the preparation of metallic nitrides wherein the nitriding operation is carried out with $N_2$ on massive elements of metal selected from the group consisting of uranium, plutonium, yttrium and the rare earth metals, the step of nitriding uranium and plutonium at approximately 400° C. and nitriding the rare earth metals from approximately 600 to 800° C., with the prior step of surface hydriding with a quantity of hydrogen substantially less than stoichiometrically required of uranium and plutonium at approximately 230° C. and prior surface hydriding of yttrium and the rare earth metals at above 350° C. whereby the initiation and development of nitriding towards the center of said elements is facilitated.

2. Process as defined in claim 1, wherein said massive elements of metal are subjected to the action of hydrogen then to the action of nitrogen.

3. Process as defined in claim 1, wherein said massive elements of metal are subjected to the action of a mixture of hydrogen in quantities substantially less than stoichiometrically required and nitrogen.

4. Process as defined in claim 1, including the step of crushing the elements of rare earth metals and of yttrium when they have reached a predetermined nitriding rate.

References Cited

UNITED STATES PATENTS

| | | | |
|---|---|---|---|
| 2,534,676 | 12/1950 | Newton et al. | 23—14.5 |
| 2,544,277 | 3/1951 | Newton et al. | 23—14.5 |
| 2,776,874 | 1/1957 | Reed et al. | 23—284 |
| 3,180,702 | 4/1965 | Lapat | 23—14.5 |

OTHER REFERENCES

Katz et al., "The Chemistry of Uranium," McGraw-Hill Book Co., New York, 1951, pp. 232–241.

CARL D. QUARFORTH, *Primary Examiner.*

BENJAMIN R. PADGETT, L. DEWAYNE RUTLEDGE, *Examiners.*

S. TRAUB, *Assistant Examiner.*